US008942298B2

(12) United States Patent
Holm et al.

(10) Patent No.: US 8,942,298 B2
(45) Date of Patent: Jan. 27, 2015

(54) DATA COMMUNICATIONS

(75) Inventors: Sverre Holm, Asker (NO); Rune Holm, Asker (NO)

(73) Assignee: Sonitor Technologies AS, Oslo (NO)

( * ) Notice: Subject to any disclaimer, the term of this patent is extended or adjusted under 35 U.S.C. 154(b) by 824 days.

(21) Appl. No.: 12/096,537

(22) PCT Filed: Dec. 11, 2006

(86) PCT No.: PCT/GB2006/004615
§ 371 (c)(1),
(2), (4) Date: Oct. 6, 2008

(87) PCT Pub. No.: WO2007/066137
PCT Pub. Date: Jun. 14, 2007

(65) Prior Publication Data
US 2009/0213942 A1 Aug. 27, 2009

(30) Foreign Application Priority Data

Dec. 9, 2005 (GB) .................................. 0525126.9

(51) Int. Cl.
*H04L 27/00* (2006.01)
*H04B 11/00* (2006.01)
*H04B 13/02* (2006.01)
(52) U.S. Cl.
CPC ................ *H04B 11/00* (2013.01); *H04B 13/02* (2013.01)
USPC ........... 375/259; 375/303; 375/305; 375/308; 375/316; 375/324; 375/329

(58) Field of Classification Search
USPC .......... 375/259, 303, 305, 308, 324, 329, 316
See application file for complete search history.

(56) References Cited

U.S. PATENT DOCUMENTS

| | | | |
|---|---|---|---|
| 4,423,519 A | 12/1983 | Bennett et al. | |
| 4,451,916 A * | 5/1984 | Casper et al. | 714/4.3 |
| 4,475,216 A * | 10/1984 | Noguchi | 375/272 |
| 4,799,239 A * | 1/1989 | Pearlman et al. | 375/334 |
| 4,905,211 A | 2/1990 | Mackelburg et al. | |
| 6,130,859 A | 10/2000 | Sonnenschein | |
| 6,301,306 B1 * | 10/2001 | McDonald et al. | 375/259 |
| 7,283,423 B2 | 10/2007 | Holm et al. | |
| 2004/0130484 A1* | 7/2004 | Krasner | 342/357.02 |
| 2006/0193270 A1 | 8/2006 | Gehasie et al. | |

FOREIGN PATENT DOCUMENTS

| | | |
|---|---|---|
| GB | 1429265 | 3/1976 |
| JP | 2003-124848 | 4/2003 |

OTHER PUBLICATIONS

Chihiro Fujita, "A Proposal of Sub-carrier Parallel Combinatorial Multi-carrier DS-CDMA System", Institute of Electronics, Information and Communication Engineers Symposium: Collection of Papers, Communication 1, p. 446, B-5-61, Mar. 7, 2000.

(Continued)

*Primary Examiner* — Kabir A Timory
(74) *Attorney, Agent, or Firm* — O'Shea Getz P.C.

(57) ABSTRACT

Data communication apparatus comprising transmission means adapted to transmit data as the ratio of pairs of frequencies between objects that are moving relative to one another. It is particularly applicable to acoustic data communications at ultrasound frequencies in air.

20 Claims, 4 Drawing Sheets

(56) References Cited

OTHER PUBLICATIONS

Noriko Ishikawa, "A Study on Multi-tone Combinatory Fast Frequency Hopping/MFSK System", Institute of Electronics, Information and Communication Engineers Symposium: Technical Research Report, vol. 98, No. 214, IEICE Technical Report, Japan Institute of Electronics, Information and Communication Engineers, Jul. 1998.

Sverre Holm et al., "Indoors Data Communications Using Airborne Ultrasound, Acoustics, Speech, and Signal Processing", 2005 Proceedings, vol. 3, pp. 957-960, Mar. 23, 2005.

* cited by examiner

DATA COMMUNICATIONS

Applicant hereby claims priority benefits of PCT Patent Application no. PCT/GB2006/004615 filed Dec. 11, 2006 which claims priority to Great Britain Patent Application No. 0525126.9 filed Dec. 9, 2005, the disclosures of which are herein incorporated by reference.

BACKGROUND OF THE INVENTION

1. Technical Field

This invention relates to the transmission of data between objects which are moving relative to one another, e.g. a moving transmitter and a stationary receiver. It is particularly, but not exclusively, applicable to acoustic data communications at ultrasound frequencies (of the order of 40 kHz) in air.

2. Background Information

PCT Patent Application Publication No. WO 03/087871 discloses a locating system based on ultrasonic communications which is able to determine in which room each of a number of ultrasonic transmitter tags is located. Each tag transmits a unique identification signal which is picked up by a one of the receivers which are provided in every room The Applicant has observed that current ultrasonic positioning systems such as this use an acoustic data link which is very restricted in its data rate. This limits the number of objects/persons that can be tracked and/or the update rate and in particular how well rapid movements of many persons/objects in and out of rooms can be followed with accuracy.

The most advanced acoustic communications systems of which the applicants are aware are those that are found in underwater acoustics. The first generation of digital modems were based on frequency shift keying (FSK), as FSK is robust in terms of time and frequency spreading of the channel. But FSK is inefficient in how it uses bandwidth, so in recent years there has been a large effort in developing more efficient coherent systems based on e.g. various forms of phase shift keying (PSK), as described for example in the article by D. B. Kilfoyle and A. Baggeroer, *The state of the art in underwater acoustic telemetry*, IEEE Trans. Ocean. Eng., OE-25, 1-1111 (2000), often in combination with adaptive equalization. Despite this, incoherent FSK and MFSK (multiple FSK) systems play a large role in providing reliable communications in practice. Such systems are typically non-adaptive and designed with sufficient bandwidth to accommodate the harshest environment expected. This means that under ordinary, more favourable conditions the systems will be operating inefficiently with respect to bandwidth and power. Such inefficiencies can be substantial. One of the design constraints that causes this low bandwidth efficiency is the presence of frequency shifts due to the Doppler effect.

Wherever a transmitter and receiver are moving towards or away from each other the frequency of the signal perceived at the receiver differs from that transmitted by the transmitter as a result of the differing distance that each wavefront must travel between the two. This is known as the Doppler effect.

The relatively low value of the speed of sound causes even low speed movements to create relatively large frequency shifts. A relative movement of v, where a positive v means movement from the source towards the receiver, shifts the frequency to:

$$f' = f(1 + v/c) \qquad (1)$$

Where f is the original frequency and c is the velocity of sound (e.g. about 340 m/s in air and about 1500 m/s in water).

As an example, an underwater acoustic communications system operating at a centre frequency of 25 kHz and which is used on an AUV (Autonomous Underwater Vehicle) with a velocity of 10 knots will be Doppler shifted by 86 Hz or 3.4% of a typical relative bandwidth of 10% of the centre frequency (i.e. 2500 Hz). An airborne ultrasound communications system transmitting at 40 kHz from a transmitter which is moving at a speed of 6 km/h (fast walking) will experience an even larger Doppler shift of 196 Hz or 4.9% of the typical relative bandwidth of 10% (i.e. 4000 Hz).

The Doppler shift will generate a shift up or down in frequency depending on the relative motion. MFSK uses multiple frequencies simultaneously and can be considered to be several FSK systems working in parallel. The only relationship between the frequencies is that they should not be allowed to overlap. In an MFSK system, it is theoretically possible and desirable to space frequencies as close as the inverse pulse length, B=1/T. However, the Doppler shift, $f_D = f' - f$ may easily exceed this spacing by a large amount, $|f_D| \gg B$, and thus effectively limit the number of frequencies that can be used and consequently also the bit rate.

The standard way to accommodate Doppler shifts is to space frequencies according to the maximum Doppler shift plus a certain guard band, $f_g$:

$$\Delta f > B + 2|f_d| + f_g \qquad (2)$$

The ratio of $\Delta f$ and B can be substantial. As transducers have a limited bandwidth this represents a loss in the effective data rate which can be achieved in accordance with this scheme.

The modulation schemes described so far are adaptations of methods that work well in radio communications. It is however an object of the invention to provide a scheme more appropriate for acoustic environments.

DISCLOSURE OF THE INVENTION

When viewed from a first aspect the invention provides a data communication system comprising transmission means.

When viewed from a second aspect the invention provides a method of data transmission comprising encoding data as a plurality of signals comprising pairs of frequencies, transmitting said frequency pairs, receiving each pair of frequencies, determining the ratio of said frequencies and decoding data therefrom.

The invention also extends to a transmitter adapted to transmit data as the ratio of pairs of frequencies. It also extends to a receiver adapted to detect a pair of frequencies, determine the ratio between said pair of frequencies Thus it may be seen that in accordance with the invention in contrast to known data transmission methods such as FSK, rather than data being encoded in the value of the frequency of a carrier signal, the data bits are represented by the frequency ratio between a pair of carrier signals.

The primary advantage appreciated by the inventor of encoding data in the ratio of two frequencies is that this ratio is invariant under Doppler shifting arising from relative movement between the transmitter and receiver. This will be explained below:

As shown above as a consequence of Doppler effect each of the transmitted frequencies $f_1$, $f_2$ will undergo a shift in frequency given by:

$$f_1' = f_1(1 + v/c)$$

$$f_2' = f_2(1 + v/c)$$

However if rather than encoding the data in the absolute frequencies of the signals transmitted, the data are, in accordance with the invention, encoded in the ratio of frequencies of pairs of signals then the received signal will be as follows:

$$\frac{f_2'}{f_1'} = \frac{f_2(1+v/c)}{f_1(1+v/c)} = \frac{f_2}{f_1}$$

Thus the original ratio is exactly preserved under the Doppler shift. This means that no additional bandwidth is required to accommodate Doppler shifting, at least due to constant velocity movement between the transmitter and receiver which makes for a communications system which is robust to movement. Consequently the available bandwidth can be used significantly more efficiently for data transmission. For example the large guard bands that are required in conventional FSK systems are no longer needed.

In a simplistic implementation the data could be encoded in individual single bits by having just two possible values of the ratio. This would require very low bandwidth as the tones from which the ratio is made up can be spaced very close together. Preferably however more than two possible ratios are provided so that an enhanced data rate can be achieved for a given bandwidth. In preferred embodiments for example the number of ratios available is a power of two so that a plurality of bits may be transmitted at a time. For example if there are 64 possible values of the ratio, six bits of data may be transmitted in each timeslot. Significantly larger numbers of values of the ratio are possible in a given bandwidth since they are not affected by standard Doppler shifting as demonstrated above. Preferably the range of possible ratios is divided into preferably equal increments, each of which corresponds to a possible data value.

The ratio could be changed for successive timeslots by changing the absolute value of one or both of the carriers.

Although the invention may be applied to data communication using electromagnetic waves, the Doppler shift to which transmitters travelling at ordinary terrestrial speeds are subjected is, in general, small compared to 1/T. The preferred application of the invention is therefore to sonic, most preferably ultrasonic communications. By sonic is meant compression waves in a fluid medium; it is not intended that any inference as to the frequency or other parameters describing the waves is drawn. By ultrasonic communications is meant waves at a frequency above the normal hearing range. This is conventionally taken to mean frequencies above 20 kHz.

In accordance with the invention data is encoded as the ratio between a pair of signals at two frequencies. In accordance with some embodiments the signals could be transmitted simultaneously. However the two frequencies do not necessarily need to be transmitted simultaneously. For example in other embodiments they are transmitted sequentially. This would have the advantage that a single oscillator could be employed as only one frequency would need to be produced at any given time. Although such a scheme would inevitably reduce the data rate compared to simultaneous transmission since each bit would take twice as long to transmit, a significant improvement over known schemes is still achieved by avoiding the need for large guard bands.

Where the pair of signals are not transmitted simultaneously, they can be separated by other signals, e.g. in accordance with an interleaving scheme. Preferably, however, the pair of signals are transmitted in succession, i.e. one immediately after the other. In some preferred such embodiments, the pair of signals are transmitted in sufficiently quick succession that they are capable of being detected as if they had been transmitted simultaneously. In these embodiments, the receiver is preferably configured so as to detect such sequential transmissions as simultaneous. For example, the receiver may employ a fast Fourier transform (FFT) when decoding the signals, the FFT frame size being set such that the two signals fall within the same FFT frame. In an exemplary embodiment, the first signal of a pair of signals is transmitted for a duration of 1 millisecond, followed, after a gap of less than 1 millisecond, by the second signal, also transmitted for a duration of 1 millisecond.

In some embodiments, the transmission of a pair of signals may be repeated one, two, three or more times. This could facilitate the mitigation of transmission errors.

Rather than encoding data in the ratio between just two frequencies, more frequencies may be used. The data may then be encoded in the ratios between respective pairs of frequencies. For example there may be a base frequency and plurality of higher and lower frequencies; the data being encoded in the ratio between each frequency and the base frequency. The Applicant has further recognised that such a scheme would allow verification of the data received by the receiver by determining in addition the ratios between some or all of the higher/lower frequencies.

The scheme described above would bear some similarity to a multiple frequency shift keying (MFSK) system but would have the crucial difference that data was encoded in ratios of frequencies rather than their absolute values so that the frequencies may be much more closely spaced than conventional MFSK theory would dictate.

One preferred application of the invention is to an ultrasonic system for locating a plurality of people or objects to a particular room. Ultrasound is particularly suited to such applications since it has the characteristic that the signals are effectively confined to a room because they do not penetrate walls, diffract at doorways etc. Ultrasound is also far less prone to environmental interference than, for example, infrared communication which can easily be swamped by sunlight.

There are however further applications in which the Applicant envisages that the principles of the invention in improving the data rate achievable with ultrasonic communication could be of benefit. A first example is in underwater data communications with a moving platform such as to/from an AUV (autonomous underwater vehicle). Although the problem of Doppler shift is reduced in water due to the relatively faster speed of sound, the relative velocities between transmitter and receiver tend to be greater.

Another example is in remote control applications, especially in industrial environments. Ultrasound again has the advantage that a direct line of sight is not required (as it is for example with infrared transmission) but on the other hand there is no danger of accidentally controlling machines in adjacent rooms (as there might be with radio frequency transmission) which could be a significant hazard where industrial robots are concerned. Of course in accordance with the invention higher data rates may be achieved than hitherto.

A third example of a beneficial application also exploits the confinement of ultrasonic signals to a room is in wireless communication between equipment e.g. a wireless computer keyboard. There is a significant benefit in effectively preventing eaves-dropping in this situation.

A further potentially significant application is in the wireless communication of patient data from a monitoring device such as a heart monitor to a base station. This would allow real-time updating of data from the patient to the base station without the patient having to remain stationary. The use of ultrasound is beneficial in such applications from the privacy perspective mentioned above and also because it is seen as advantageous to avoid having radio transmitters close to human tissue or to devices such as pace-makers.

The Applicant has recognised that since the receiver is now required to detect correctly two tones rather than one for each data word, there will be a marginal reduction in the aggregate detection probability at a given range, transmission power, noise level etc. Put another way, for a given minimum aggregate detection probability (say 99%) it will be necessary to raise the detection probability for each individual tone. In practical terms this means that either a slightly lower range must be accepted or a slightly higher transmitter power used. However it is believed that the very significant increase in data rate which can be achieved in accordance with at least some embodiments of this invention, this is a relatively minor consideration.

BRIEF DESCRIPTION OF THE DRAWINGS

The invention will now be explained further using specific examples and embodiments thereof, with reference to the accompanying drawings which are non-limiting on the scope of the invention and in which.

DETAILED DESCRIPTION OF THE INVENTION

Figure 1:
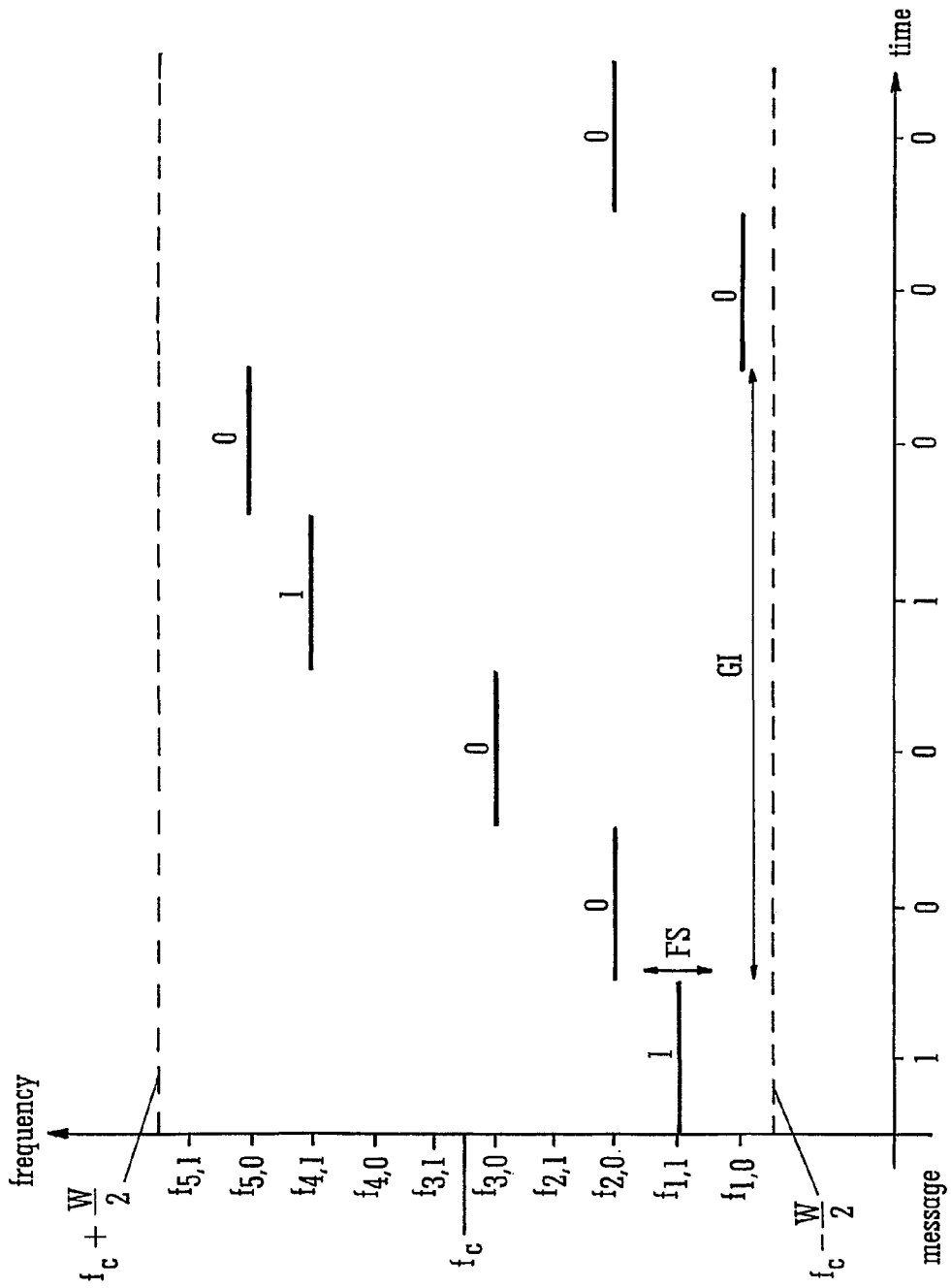
FIG. 1 is a graph of frequency against time for a simplified MFSK scheme.

FIG. 1 shows a simple multiple frequency shift keying (MFSK) system. The system has available a bandwidth W centred around the middle frequency $f_c$. The minimum and maximum frequencies that can be used are therefore $f_{min}=f_c-W/2$ and $f_{max}=f_c+W/2$ The bandwidth is divided into five frequency pairs $f_{i,0}$ and $f_{i,1}$ which correspond to 0 and 1 respectively. In order to transmit the digital signal 1001000 as shown in FIG. 1, the first bit 1 is transmitted by transmitting a tone at frequency $f_{1,1}$ which is the '1' bit frequency from the lowermost of the five pairs. The next bit, which is a '0', is transmitted using the 2nd frequency pair and is thus transmitted at frequency $f_{2,0}$. The next '0' bit is transmitted using the third frequency pair, i.e. at frequency $f_{3,0}$. The fourth, '1', bit is transmitted at $f_{4,1}$. The fifth '0' bit is transmitted using the last pair, i.e. $f_{5,0}$. The sixth bit is transmitted using the initial pair again, i.e. $f_{1,0}$ and so on.

Cycling through the frequency pairs like this is employed in order to maximise the time interval GI between when frequencies are re-used in order to avoid interference between earlier and later signals as the result of reverberations. The minimum time between the re-use of a frequency is known as the guard interval. The need for a guard interval clearly places a limitation on the maximum data rate that can be achieved.

Cycling through the frequency pairs is described for clarity of illustration but MFSK schemes can also transmit multiple tones simultaneously.

It will be observed that the frequencies $f_{i,0}$ and $f_{i,1}$ are spaced out across the bandwidth. The spacing between adjacent frequencies FS is required to prevent interference between signals when they suffer Doppler shifts. This limits the number of frequency pairs which can be used before they must be recycled and thus also limits the maximum data rate. The minimum spacing is usually set to the maximum frequency shift that would be expected from relative movement between the transmitter and receiver.

A coding scheme in accordance with the invention will now be described.

There are three bandwidth parameters that come into play: the available bandwidth, W; the centre frequency, $f_c$; and the absolute minimum spacing for a synchronous multiple frequency system which is the inverse of the pulse length T used, B=1/T. In an asynchronous system, a larger spacing has to be used as the amount of overlap between processing frames and pulse length will determine effective pulse bandwidth. For example the spacing might be doubled, i.e. to 2B.

There are also three time domain parameters that are important: T, the pulse length;

$t_r$, the reverberation time or time before a frequency can be reused (equivalent to the guard interval GI of FIG. 1); and the maximum expected acceleration, $a_{max}$.

The method for coding outlined here only applies to the case where a short message (a burst) is to be sent and where each ratio between the two frequencies is used only once. A more elaborate scheme can be devised for continuous transmission. In a given application a processor might be used to carry out a search algorithm to find the optimal way of spacing frequencies using the criteria that frequencies and frequency ratios should be reused as seldom as possible.

One suggestion for a coding algorithm for a burst of data is as follows. Again the minimum and maximum frequencies available are $f_{min}=f_c-W/2$ and $f_{max}=f_c+W/2$. From the parameters given, the maximum frequency shift due to acceleration for a single pulse can be determined as:

$$f_a = \frac{a_{max} t_r f_{max}}{c}.$$

Although not essential, in this example this is taken into account when setting the minimum spacing between transmitted frequencies. With Doppler shift from acceleration taken into account, the minimum frequency distance is:

$$\Delta f > 2B + f_a$$

If this is compared with equation 2 above and setting $f_a=0$, i.e. under constant speed, no consideration of the Doppler shift needs to be taken into account so frequencies can be spaced much closer here.

Since information is being encoded into ratios between two frequencies, this may be converted into $\Delta r = \Delta f/f_{min}$ which is the smallest possible difference between two frequency ratios. The required frequency spacing sets the minimum ratio to:

$$r_{min} = \frac{f_{min} + \Delta f}{f_{min}}.$$

The corresponding maximum ratio $r_{max}$ could be as large as $f_{max}/f_{min}$ i.e. using all available bandwidth. However, this would give no freedom in the placement of the two frequencies $f_1$ and $f_2$. To allow both a large frequency ratio and some freedom in the actual values for $f_1$ and $f_2$, the maximum ratio is preferably restricted. In this example it is restricted to using 2/3 of the available bandwidth but other limits could be used.

i.e. $r_{max} = \dfrac{f_{max}}{f_{max} - \dfrac{2}{3}W}$.

The actual encoding is carried out by dividing the range of ratios $r_{min}$ to $r_{max}$ into equal linear increments and assigning data words or symbols to each linear increment. The number of symbols available is given by:

$$n_{sym} = \dfrac{r_{max} - r_{min}}{\Delta r}$$

Figure 2:
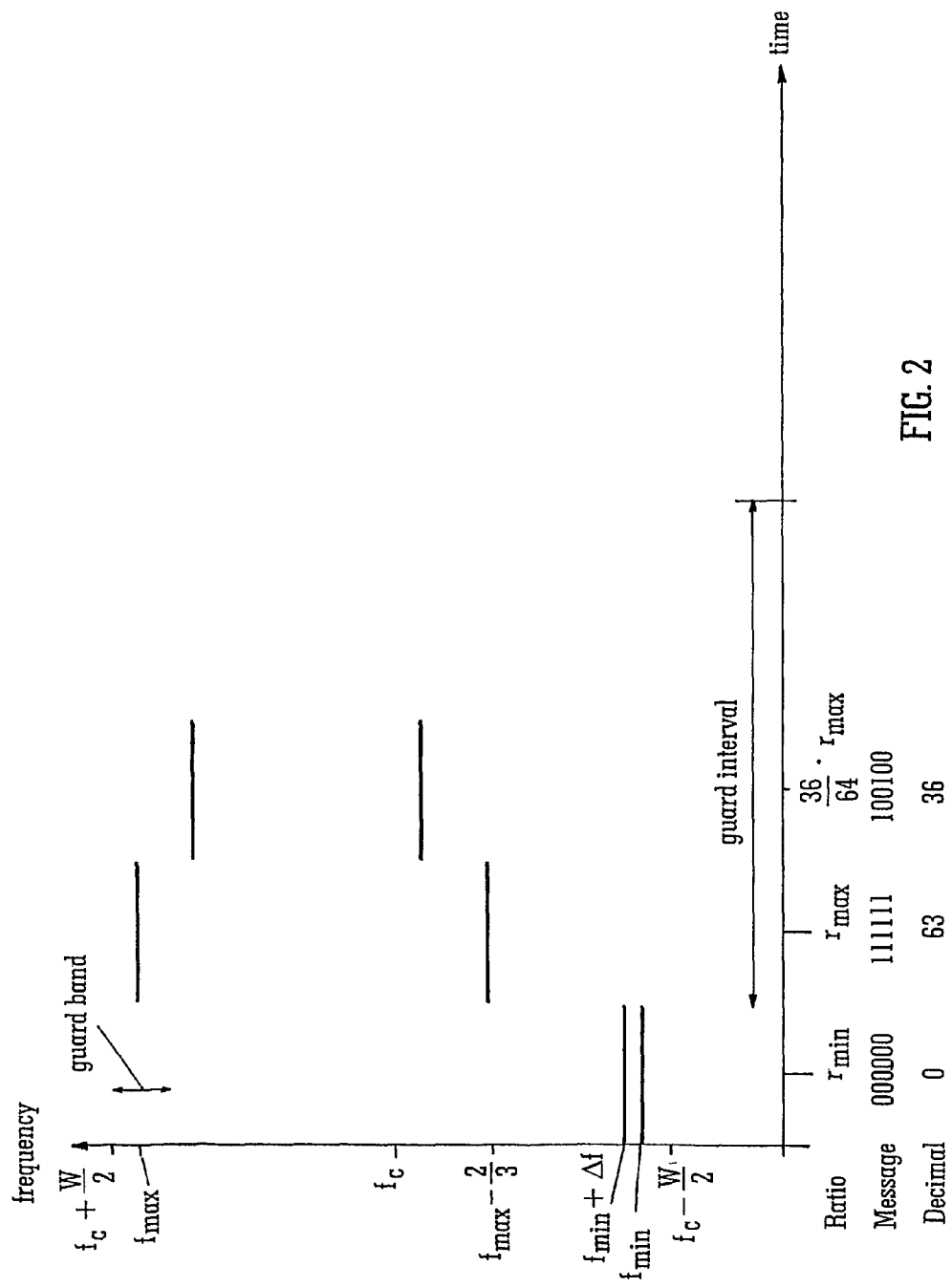
FIG. 2 is a similar graph for an exemplary scheme in accordance with the invention.

In the example shown in FIG. 2 there are 64 symbols.

It follows that $\lfloor \log_2 n_{sym} \rfloor$ bits can be encoded in a symbol, i.e. 6 in the previous example. Since the symbol rate is 1/T, the bit rate is then given by:

$$\text{rate} = \dfrac{\lfloor \log_2 n_{sym} \rfloor}{T}.$$

The foregoing calculation assumes that unused frequencies to use in symbols are always available which is a reasonable assumption for short messages. For longer transmissions, a mechanism that frees a frequency for reuse after the reverberation time $t_r$ has passed would be required.

An example of the above analysis will now be given for an application where the transmitter is carried by a person walking. Taking the centre frequency $f_c$ as 35 kHz and the bandwidth W=5 kHz gives a frequency range from $f_{min}$=32.5 kHz to $f_{max}$=37.5 kHz. The maximum Doppler shift is assumed to be that given by fast walking pace, i.e. 6 km/h or 6/3.6=1.67 m/s. A maximum acceleration of $a_{max}$=0.5 m/s$^2$ is assumed and the system is designed to work in rooms where the reverberation on each tone may last up to 0.2 s.

The pulse length has to be much larger than the maximum reverberation time so that most of the energy has died out before the next pulse is sent. Taking therefore a pulse length of T=0.05 sec gives a pulse bandwidth of B=1/T=20 Hz.

For comparison purposes the data rate of a conventional communications system employing MFSK will be calculated. The maximum Doppler shift in such a system would be +/-v/c*$f_c$=+/-(1.67/340)*35000=+/-172 Hz. To this is added the pulse length bandwidth 2*B=40 Hz and the frequency smearing due to acceleration. The acceleration gives a frequency smearing or shift of:

$$\dfrac{a_{max} t_r f_{max}}{c} = \dfrac{0.5\,\frac{m}{s^2} \cdot 0.2\,s \cdot 35\,\text{kHz}}{340\,\frac{m}{s}} = 10\,\text{Hz}.$$

When this is all added together it gives a range of variation of a single tone of:

$\Delta f = +/-(172+40+10) = +/-222$ Hz.

The implication is that one can use a total of 5 kHz/(2*222) Hz=11.3 possible frequencies in the available bandwidth. In practise this is 5 frequency pairs or 10 different frequencies. Due to the reverberation one cannot transmit on a single frequency more often than 1/0.2 s=5 times per second and thus the data rate for a single frequency pair is 5*5=25 bit/s.

Returning now to the example coding scheme in accordance with the invention, the smallest ratio between two frequencies is determined by how close two frequencies can be before it is too hard to distinguish them. This is $\Delta f=2*20+10$ Hz=50 Hz due to the width of the pulse and the acceleration. This gives the smallest frequency ratio as:

$r_{min} = 1 + 50\,\text{Hz}/f_{min} = 1.0015$ and the largest frequency ratio as:

$$r_{max} = \dfrac{f_{max}}{f_{max} - \dfrac{2}{3}(f_{max} - f_{min})}$$

$$= 1.098 \cdot \Delta r$$

$$= 50/32500$$

$$= 0.0015.$$

This gives a total of $$\dfrac{r_{max} - r_{min}}{\Delta r} = 64 = 2^6$$

possible different messages per frequency pair or a coding of a 6 bit message per transmitted frequency pair instead of 1 bit per pair as in MFSK. The data rate achieved in this example is therefore 150 b/s or an increase of a factor of six in compared to the conventional scheme.

A graph of frequency against time for a system operating in accordance with the example above is shown in FIG. 2.

In this scheme rather than a single tone representing a single bit, a 6 bit data word is represented by the ratio between two tones transmitted simultaneously. Considering the first time slot in the graph of FIG. 2, two tones are transmitted at frequency $f_{min}$ and $f_{min}+\Delta f$ respectively. $f_{min}$ is the minimum frequency of the bandwidth taking into account a guard band to ensure that the bandwidth is not exceeded. The difference $\Delta f$ represents the minimum frequency increment based on the pulse length bandwidth and the acceleration Doppler shift. The spacing is significantly smaller than the frequency spacing of the MFSK system of FIG. 1 since even with Doppler shift from relative (constant velocity) movement, the ratio between the two tones remains constant.

In the first time slot the minimum tone ratio $r_{min}$ is transmitted which therefore corresponds to the zero data word 000000. In the second time slot the maximum tone ratio $r_{max}$ is transmitted. The lower tone is $f_{max}-(2/3)W$ The upper tone of the ratio is f max, the highest frequency in the bandwidth when the upper guard band is taken into account. The second timeslot therefore transmits the highest data word 111111 or 63 in decimal. In the third timeslot an intermediate tone ratio is transmitted, more precisely a ratio of 36/64 of the maximum ratio. This corresponds therefore to 100100 (the same code transmitted in the whole of the sequence of FIG. 1).

It may be seen therefore that in accordance with this example of the invention, a data rate six times greater than using FSK can be achieved for the same bandwidth.

A guard interval is still used in this example in that no tone or tone ratio is reused within a period equal to the guard interval. For short messages this is a good assumption. However for longer messages, where it may be necessary to manage the reuse of tones or ratios, the described scheme may also be beneficial. This results from the fact that $r_{max}$ covers only two thirds of the bandwidth, so a required tone ratio may be achieved using a choice of frequency combinations within the bandwidth. This choice can be managed adaptively by the transmitter to minimise reuse since there will be flexibility as to which part of the bandwidth is used, especially for the smaller ratios.

One possible application of a communication scheme in accordance with the invention will now be described.

Figure 3:
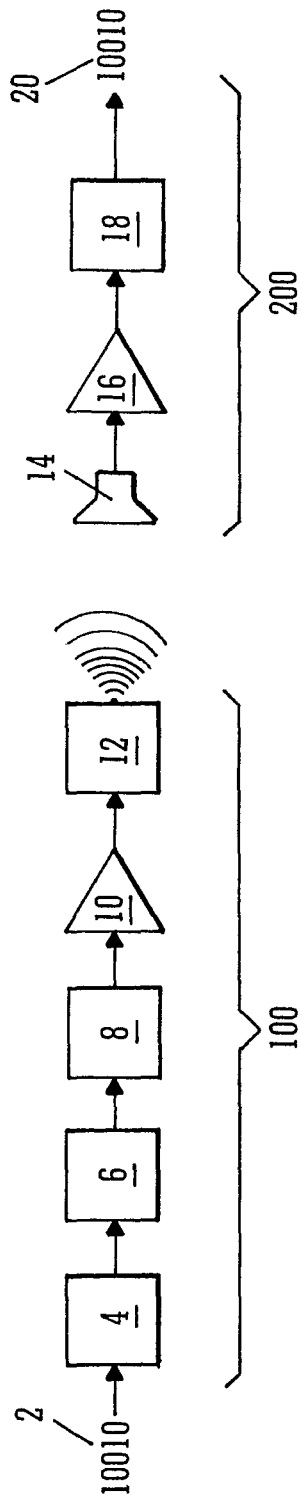
FIG. 3 is a block diagram of a system embodying the invention.

A simplified schematic diagram of a system embodying the invention is shown in FIG. 3. On the left hand side of the Figure is the transmitter module 100. The leftmost block represents the raw digital data 2 which is to be transmitted. This may have been converted from analogue data depending on the particular application. The data is then processed by a processor 4 which converts the data into a suitable structure, e.g. adding headers, check bits etc. and encrypts the data if required. The data which is ready to be transmitted is then passed to the coder 6. The coder 6 divides the data into words, e.g. of 6 bits in the previously described example and then calculates the frequency ratio for each word. The coder then determines exactly which frequencies will be used to give the calculated ratio, based for example on the frequencies used in the last few timeslots. The coder then controls a suitable signal generator 8 to produce electrical signals corresponding to the required tones which are amplified by an amplifier 10 and transmitted by the ultrasonic transducer 12.

At the receiver module 200, a suitable ultrasonic sensor transducer converts the pressure waves to an electrical signal which is amplified and filtered at module 16 and then the signal is decoded with a decoder 18 by determining the ratio between the two frequencies received in order to recover the data 20. Even if the transmitter and receiver transducers 12,14 are moving relative to each other so that the transmitted signals undergo Doppler shift, their ratio remains constant and thus the data may be recovered accurately.

Figure 4:
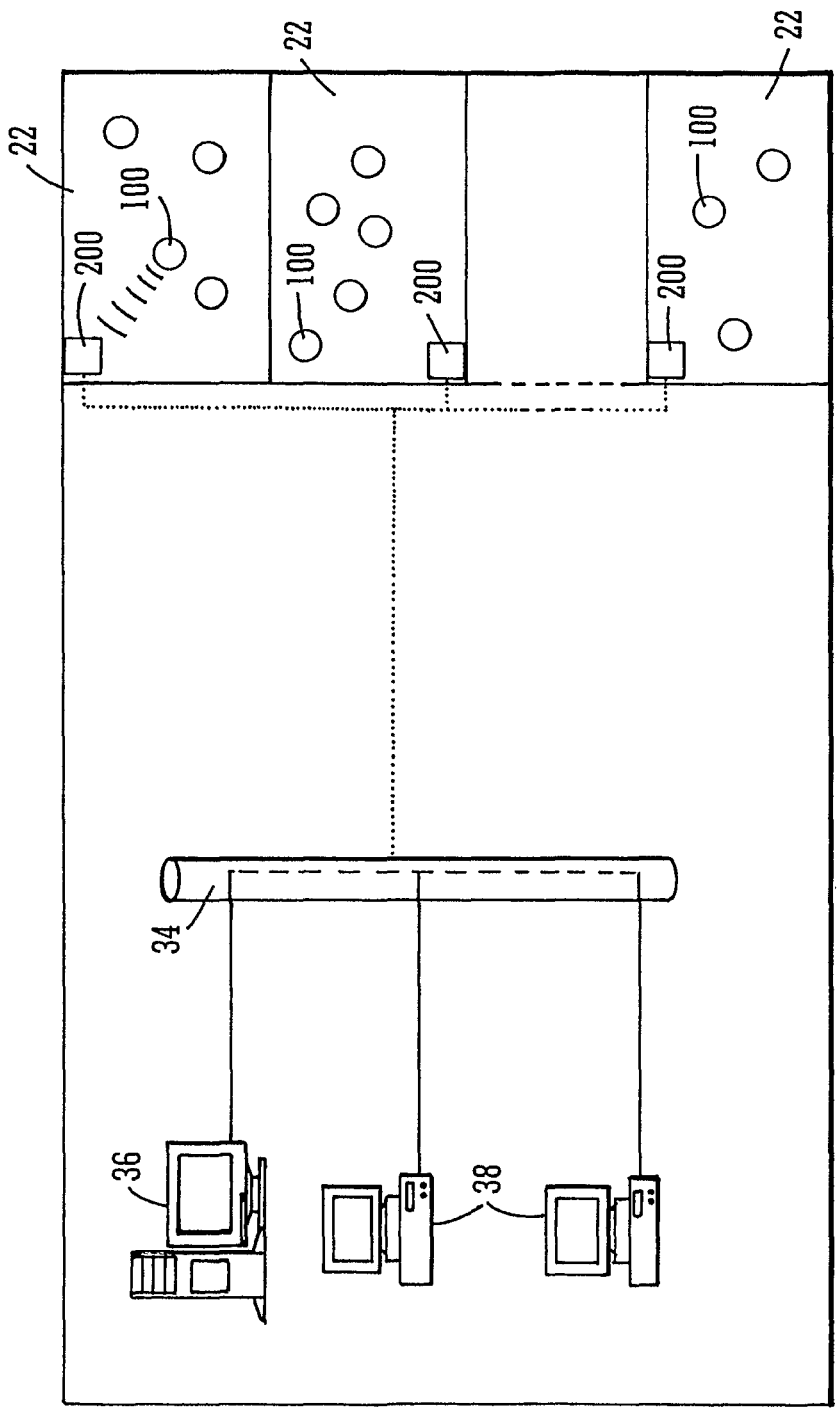
FIG. 4 is a schematic diagram of a locating system embodying the invention.

Looking at FIG. 4, there may be seen a schematic representation of a locating system in accordance with the invention. On the right hand side of the diagram is a plurality of rooms 22. Each room contains an ultrasonic receiver module 200. The receiver modules 200 are all connected to a data network which may include a central server 36 and one or more clients 38.

Within the system there are a large number of ultrasound transmitter tags 100. In the simplest embodiment where the tags are used simply to locate people or equipment to one of the rooms 22, each transmitter 100 may be pre-programmed to transmit a unique identifying code. In more complicated embodiments the transmitter may transmit additional information. They may be set up to transmit at fixed intervals or in response to an event occurring—e.g. upon detection of motion by the tag or upon receiving a polling signal.

When a tag 100 transmits its data, the ultrasound signal will be confined to the room 22 in which it is located. The signal will be detected and decoded by the receiver 200 in that room. By passing the identification information for both the transmitter 100 and receiver 200, to the network 34, the central server 36 can determine which room each transmitter is in. The improved data rate which is achievable in accordance with the invention means that the system may include a large number of transmitter tags 100 which may be moving around and nonetheless be able to locate them all accurately to the respective rooms 22. The location information may of course be seen and processed by any of the client terminals 38.

It will be appreciated by those skilled in the art that the examples and applications set out above are by no means exhaustive and many variations and modifications may be made within the scope of the invention. For example, it is not essential that the two tones are transmitted simultaneously; they could be transmitted sequentially or even with a mutual delay although it would normally be desirable to minimise this to reduce the risk of the relative velocity of the transmitter and receiver changing appreciably between the tones.

It is also not essential that the calculated ratios are between only two tones —three or more could be used.

The embodiments shown employ one-way communication but of course the principles may be used equally where two-way communication is used.

What is claimed is:

1. Data communication apparatus comprising:
    a coder adapted to receive data for transmission, and to encode a data bit or data word from the received data by identifying, from a set of frequency ratios, a frequency ratio that encodes the data bit or data word according to a predetermined coding scheme, wherein the set of frequency ratios consists of a number of frequency ratios, said number being more than two and an integer power of two; and
    a transmitter;
    wherein the coder is further adapted to cause the transmitter to transmit a pair of frequencies having the identified frequency ratio, thereby transmitting the coded data bit or data word.

2. The apparatus of claim 1 wherein the set of frequency ratios represents equal divisions between a minimum ratio and a maximum ratio.

3. The apparatus of claim 1 arranged to transmit sonic signals.

4. The apparatus of claim 3 wherein said signals have a frequency greater than 20 kHz.

5. The apparatus of claim 1 comprising a plurality of transmitters each arranged to transmit a unique identifying code.

6. The apparatus of claim 1, wherein the pair of frequencies consists of a first frequency and a second frequency, and wherein the first frequency is different than the second frequency.

7. The apparatus of claim 6 arranged to transmit the first frequency and the second frequency simultaneously.

8. The apparatus of claim 6 arranged to transmit said the first frequency and the second frequency in succession.

9. The apparatus of claim 6 further comprising a receiver and wherein the transmitter is arranged to transmit the first frequency and the second frequency in sufficiently quick succession that the receiver detects them as simultaneous.

10. The apparatus of claim 9 wherein the receiver is arranged to perform a fast Fourier transform, said transmitter being arranged to transmit said pair of frequencies during a single fast Fourier transform frame of the receiver.

11. A method of data transmission comprising:
    using a coder to encode a data bit or data word as a signal comprising a pair of frequencies, wherein the pair of frequencies has a ratio, identified from a set of ratios, that encodes the data bit or data word according to a predetermined coding scheme, and wherein the set of ratios consists of a number of ratios, said number being more than two and an integer power of two;
    transmitting said pair of frequencies from a transmitter controlled by the coder;
    receiving said pair of frequencies at a receiver;
    determining a value of a ratio of said pair of frequencies; and
    decoding the data bit or data word from said ratio value.

12. The method of claim 11 wherein the set of ratios is defined by a plurality of equal divisions between a minimum ratio and a maximum ratio.

13. The method of claim 11 comprising transmitting sonic signals.

14. The method of claim 13 comprising transmitting signals at a frequency greater than 20 kHz.

15. The method as claimed in claim 11 comprising each of a plurality of transmitters transmitting a unique identifying code.

16. The method of claim 11, wherein the pair of frequencies consists of a first frequency and a second frequency, and wherein the first frequency is different than the second frequency.

17. The method of claim 16 comprising transmitting the first frequency and the second frequency simultaneously.

18. The method of claim 16 comprising transmitting the first frequency and the second frequency in succession.

19. The method of claim 16 comprising transmitting the first frequency in sufficiently quick succession that they are received as simultaneous.

20. The method of claim 19 comprising performing a fast Fourier transform on a pair of frequencies received by the receiver, the pair of frequencies being transmitted in a single fast Fourier transform frame.

* * * * *